United States Patent [19]

Ponce

[11] 3,827,566

[45] Aug. 6, 1974

[54] MULTI-LEVEL, PLEATED FILTER ARRAY

[76] Inventor: Carlos I. Garcia Ponce, Mexico City, Mexico

[22] Filed: Dec. 6, 1972

[21] Appl. No.: 312,648

Related U.S. Application Data

[63] Continuation of Ser. No. 826,187, May 20, 1969, abandoned.

[52] U.S. Cl. ............... 210/338, 210/342, 210/493, 210/497
[51] Int. Cl. ............................................ B01d 27/06
[58] Field of Search ........... 210/338, 342, 493, 497, 210/314, 315

[56] References Cited
UNITED STATES PATENTS

| | | | |
|---|---|---|---|
| 2,919,807 | 1/1960 | Briggs | 210/493 |
| 3,062,378 | 11/1962 | Briggs | 210/493 |
| 3,157,566 | 11/1964 | Brafford | 162/166 |
| 3,228,527 | 1/1966 | McPherson | 210/315 |
| 3,397,793 | 8/1968 | MacDonnel | 210/493 |

Primary Examiner—Charles N. Hart
Assistant Examiner—F. F. Calvetti
Attorney, Agent, or Firm—Karl W. Flocks

[57] ABSTRACT

A multi-level, resin-impregnated, pleated, paper product filter assembly having spaced annular arrays of normally stable, pleats resiliently flexible circumferentially, a helical spring circumjacent between adjacent apices of the pleated arrays to resist collapse of paper product filters due to radial forces between adjacent filter levels and providing two-stage filtration in which the outer filter array comprises a filter pore size effecting first stage filtration of generally larger solids foreign matter, and the second or inner filter array provides second stage filtration of relatively finer foreign particles; in which perforated inner and outer cylindrical shells stabilize the filter cartridge or assembly in which the outer shell includes a plurality of spaced circumferentially disposed series of perforations to equalize pressure over the outer surface of the outer filter element; and in which an end cap and resilient seal combine with the outer and inner shells to coaxially clamp and insure against short-circuiting of the liquid being filtered.

5 Claims, 5 Drawing Figures

PATENTED AUG 6 1974

INVENTOR,
CARLOS I. GARCIA PONCE

BY KARL W. FLOCKS

ATTORNEY

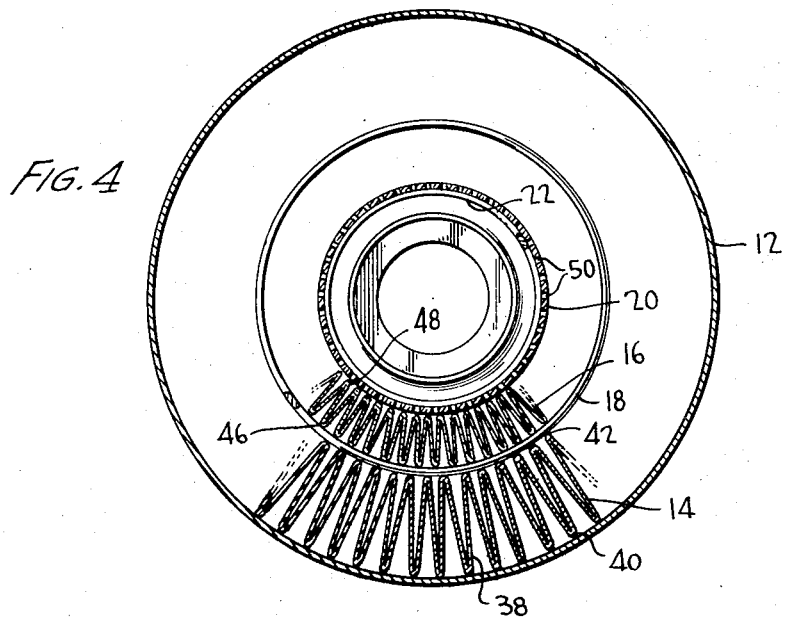
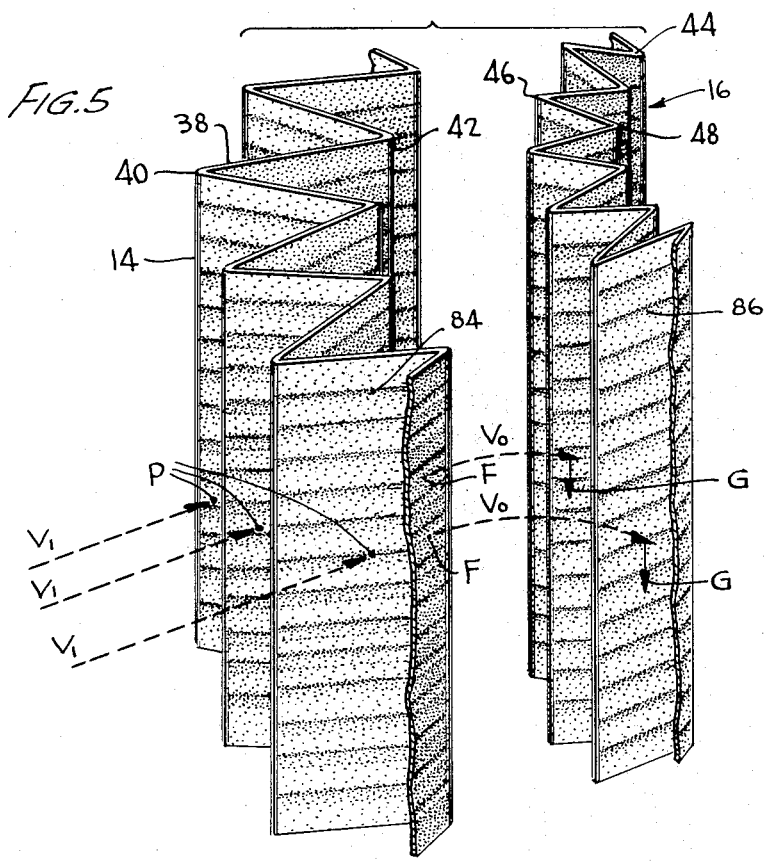
INVENTOR,
CARLOS I. GARCIA PONCE
BY KARL W. FLOCKS
ATTORNEY

MULTI-LEVEL, PLEATED FILTER ARRAY

This is a continuation application of applicant's pending application Ser. No. 826,187 filed May 20, 1969, now abandoned.

BACKGROUND

Pleated-paper filters, and those particularly designed for filtering lubrication oil, are known in the art, but are generally formed either primarily or entirely of linter (cotton fiber). When used in conjunction with diesel engines, for example, unusual variation of operating conditions exist including a high pressure oil system, a considerable amount of oil being filtered, exceptionally high pressures at the start-up of an engine where the cold oil is relatively thick, high normal running temperatures, and a wide variation of contaminant particle sizes which tend to build up on the pleated filter pores, many of these factors leading to filter pleat collapse accordingly resulting in rupture and/or short-circuiting of the lubricating oil to the filter. In addition, filter paper heretofore used containing substantial cotton fiber tends to absorb oil, further causing pore clogging through fiber expansion.

Of course, short-circuiting or failure to filter the lubricating oil properly results in excessive wear on moving parts of an engine, increasing maintenance and decreasing the use-life of an engine.

Filters particularly adapted for use in the high pressure lubrication systems of diesel locomotives, for example, should afford the maximum effective filter area; should prevent filter pleat collapse and/or short-circuiting; and should be effective to filter a wide range of particle sizes.

Applicant has found that a two-stage or two-level pleated paper filter is the arrangement which is most highly practical and desirable for filtering oil in high pressure lubrication systems of diesel locomotive engines, for example.

The prior art indicates that many attempts have been made to utilize two-stage pleated-paper filters; for example, U.S. Letters Patent No. 3,397,793 to MacDonnell. In this patent, for example, the patentee was of the opinion that apices of the pleats should be integrally connected by flexible netting. However, integrally connecting the apices of the pleated paper filters prevents complete flexure of the pleats effective to dislodge material accumulating on the filter.

SUMMARY

Primary objects of the present invention are to provide a two-stage multi-level filter assembly in which annular arrays of integral pleats of two filter elements are telescopically or axially related, and in which the paper product material from which the pleated elements are formed permits full flexure in the pleats, and wherein such paper is resistant to oil absorption, preferably being produced from a chemical wood pulp furnish combined with a resin;

to provide a filter assembly of the character mentioned above in which the resin includes a thermoplastic resin and a thermosetting resin, the former preferably being a melamine type;

to provide a filter assembly of the character mentioned above in which the resinous content of the filter elements conditions chemical wood pulp furnish so that it is oil-impermeable, thus substantially maintaining filter pore sizes uniform throughout the entire useful life of the filter assembly;

to provide a filter assembly of the character mentioned above in which preferably the filter pore size of an outer filter element is greater than the filter pore size of the inner or second filter element;

to provide in the filter assembly of the character mentioned above a helical spring interposed between adjacent apices of inner and outer peaks of first and second telescopically related filter elements for stabilizing and preventing radial rupture of the filter elements while permitting free flexure due to pressure surges and other condition variations;

to provide in a filter assembly of the character mentioned above a novel outer shell which includes axially spaced circumferentially disposed series of perforations to equalize pressure imposed on the outer surface of the outer filter element of the assembly;

to provide a novel filter assembly of the character mentioned above which includes novel inner and outer perforated stabilizing shells cooperating with end caps and a novel end seal for the outlet of the filter assembly.

These together with other and more specific objects and advantages of the invention will become apparent from the following description when taken in conjunction with the drawings forming a part thereof in which:

FIG. 4 is a horizontal section taken substantially on the plane of line 4—4 of FIG. 3; and FIG. 5 is a diagrammatic illustration, on a substantially enlarged scale, of inner and outer pleats of the two-stage filter assembly of the invention.

Figure 1:
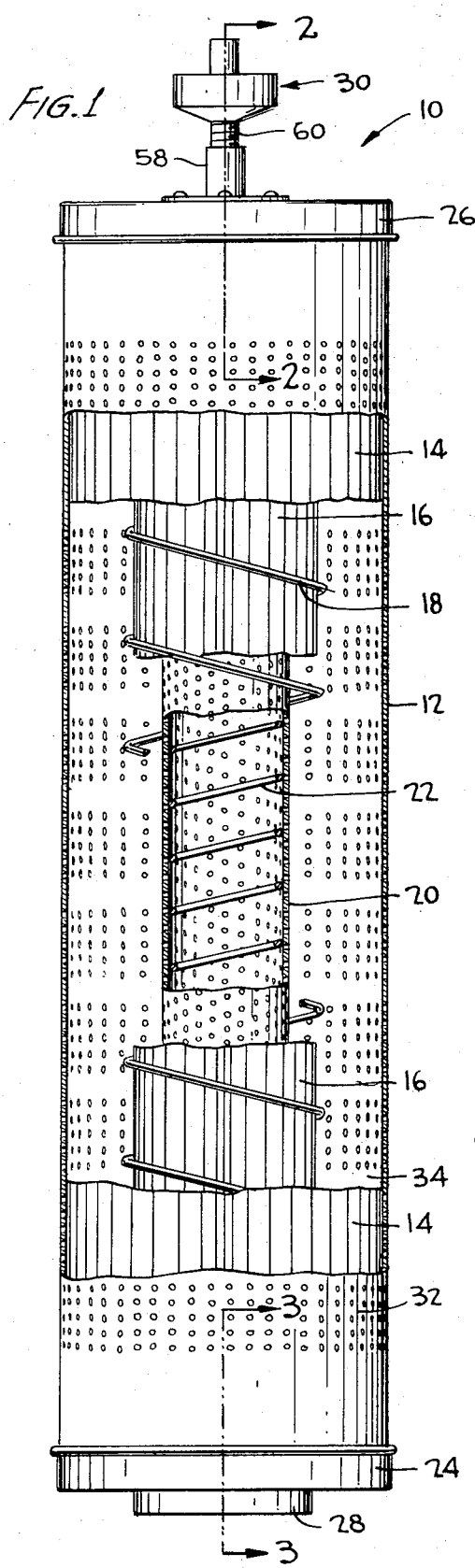
FIG. 1 is an elevational view of an assembled two-stage filter assembly with parts broken away for the purpose of illustrating structural details.

Referring to the drawings in detail, a filter cartridge assembly is indicated generally at 10 in FIG. 1 and will comprise an element whose overall dimensions are about 3½ to 4 feet long and about 6 inches in diameter when used in a diesel engine system. The assembly includes an outer cylindrical shell or sleeve 12 containing therein a first or outer filter element 14 and inner filter element 16 separated by a helical coil spring 18. Disposed axially within the inner filter element 16 is a tubular perforated sleeve or shell 20 incorporating therein and suitably secured to the inner periphery thereof a reinforcing spring 22. Secured to opposite ends of the sleeve or shell 12 are caps 24 and 26, the former being transversely apertured and incorporating an egress seal 28, and the latter being planar and incorporating a mounting or axial force-transmitting assembly 30.

The metal sleeves or shells 12 and 20, and the springs 18, 22, as well as the caps 24 and 26 will be of such a metal as to resist corrosion and deterioration when immersed in the oil being filtered. As is apparent to those skilled in the art, the assembly 10 will be mounted in a housing into which oil having foreign material entrained therein will pass, entering through the outer surface of the shell 12 passing radially through the filter elements to the center of the filter and eventually moving axially through the cap 24 and past the egress seal 28.

The sleeve 12 comprises a first series of perforations 32 which are axially spaced and which are separated by unperforated bands 34. This axial spacing of the perforations, in effect, prevents excessive concentrated radial pressures but equalizes oil distribution and assures that when relatively cold oil, for example, is first circulated the bands 34 will tend to break up or diminish the initial pressure to which the outer filter elements 14 are subjected. Additionally, the holes or perforations 36 of the band 32 are approximately ⅛ of an inch, and constitute the first phase of filtration. In other words, when oil having foreign material entrained therein engages the outer surface of the sleeve 12, the velocity in impeded to a degree wherein extremely large particles precipitate into the housing in which the filter cartridge is contained and into which oil is being directed.

The first filter element 14 will preferably have filter pores approximately 10 microns in diameter or somewhat less, though other pore sizes may be provided up to about 30 microns in diameter and constitutes an annular element, open at both ends and having a plurality of pleats 38 having alternate outer and inner peaks 40 and 42. The inner filter element 16, preferably of smaller pore size than element 14, likewise comprises an array of pleats 44 having alternate inner and outer peaks 46 and 48. As previously mentioned, the helical spring 18 is interposed between the filter elements 14 and 16, and as seen in FIG. 4, will be in substantial engagement with the apices of the inner peaks 42 and outer peaks 46 of the respective filter elements 14 and 16. The inner peaks 48 of the filter element 16 will be in substantial engagement with the outer surface of the inner perforated sleeve 20 which has holes 50 extending almost to the terminal ends; see FIG. 2, these holes being approximately ⅛ inch in diameter as are those in the sleeve 12. The sleeve 20 will be a relatively thin metal, and thus the helical spring 22 will be fixedly secured to the inner surface thereof to prevent collapse of the tube, spot welding being conveniently the means of assembly.

Figure 2:
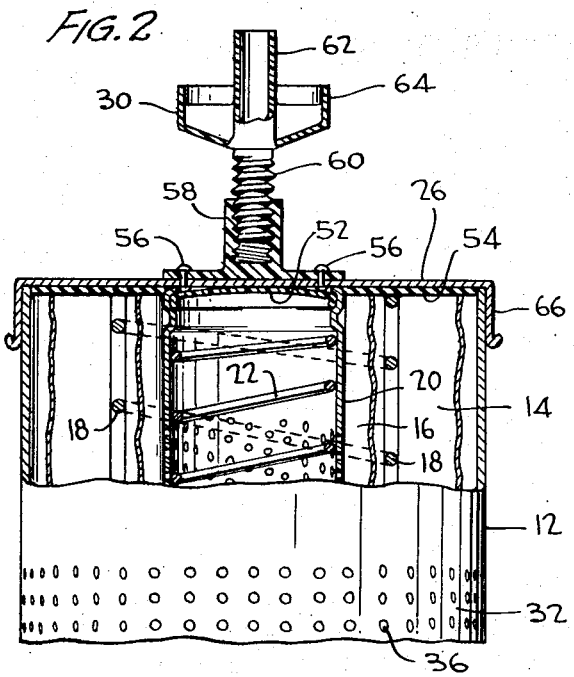
FIG. 2 is an enlarged, partially sectional view taken substantially on the plane of line 2—2 of FIG. 1.

The sleeve 20 incorporates in one end, i.e., that adjacent cap 26, a transverse seal 52 which prevents short-circuiting of unfiltered oil into the tube at the end shown in FIG. 2. The cap 26 will have on the inner surface thereof a bed of a suitable non-deteriorating mastic or adhesive 54 in which the ends of the sleeve 20, and edges of the filter elements 16 and 14 are sealingly engaged. This sealed engagement prevents short-circuiting of the unfiltered oil around the ends of the filter elements.

Fixed to the cap 26 by means of rivets 56, for example, is a mounting flange of an internally threaded sleeve 58 which threadingly receives therein a threaded stud 60 of an axially adjustable, pressure-applying element 62 which includes a handle 64. The cap 26 includes peripheral flange or collar 66 telescoped about and sealed to the edge of the sleeve 12.

Figure 3:
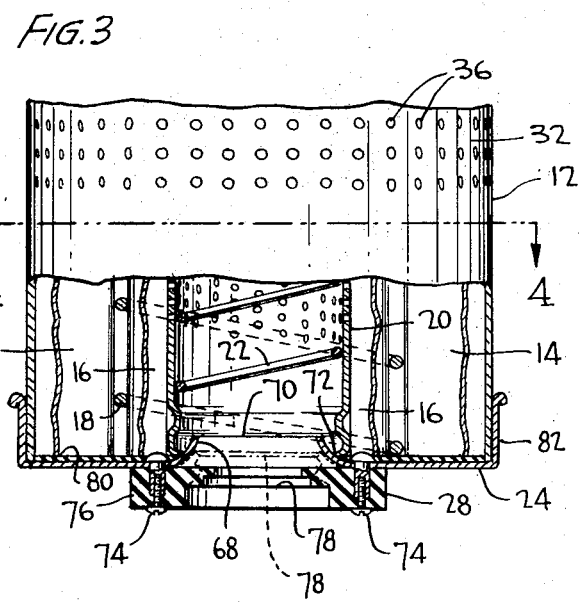
FIG. 3 is an enlarged, fragmentary sectional view taken substantially on the plane of line 3—3 of FIG. 1.

The cap 24 is centrally apertured at 68 and includes an inwardly or axially converging flange 70; see FIG. 3, which will sealingly engage the edge 72 of the sleeve 20. Retained by means of mounting screws 74 and circumposed about the opening 68 is a resilient seal 76 undercut to form a resilient flange 78 which will have connected or inserted therein a tubular, rigid conduit subject to axial pressure to distort the flange 78 into substantial sealed relationship with the inwardly converging flange 72 as indicated by phantom lines in FIG. 3. The axial pressure is afforded by engaging the handle 64 of the assembly 30 and moving the sleeve 64 axially away from the cap 26.

The cap 24 will have on the inner surface thereof a bed of mastic 80 in which the edges of the filter elements 14 and 16 are engaged and sealed. Additionally, the cap 24 includes a peripheral or marginal flange 82 telescoped on the end of the sleeve 12.

As previously mentioned, the outer filter element 14 will preferably have filter pores approximately 10 microns [though said pores may range to 30 microns] in diameter; and the inner filter element 16 will have filter pores approximately 5 microns [though said pores may range to 15 microns] in diameter. The pores may be larger and/or the same size as those in element 14. The pore sizes are approximated because of the fact that pore sizes in the range of up to about 40 microns are difficult to measure accurately with existing measuring equipment, results being largely dependent upon the ability and judgment of the individual making the measurement. As illustrated in FIG. 5, the pores P are engaged by incident solids entrained in the oil being filtered and the oil will move at a velocity $V_1$. Due to gravity forces $G_1$ and friction action F, a first gradient of incident solids will be deposited exteriorly of the filter element 14 and this constitutes the first level or first stage of mechanical filtration. The incident solids still entrained in oil which have passed through the pores P move in a somewhat parabolic path, as illustrated, and have a velocity $V_o$, i.e., the oil is slowed down, and additional incident solids precipitate down, while the oil passes through the filter element pleats 44 and into the tubular sleeve 20, then passing axially out of the sleeve 20 through the exit or egress seal 28.

The filter elements 14 and 16 preferably include circumferentially thereabout, i.e., transversely of the pleats 38 and 44, undulations 84 and 86 which do not impair the porosity of the filter elements but, on the other hand, lend to its resiliency and stability. It will be observed that the filter elements 14 and 18 comprise annular arrays of pleats which are free to move or flex circumferentially and to a relatively minor degree longitudinally but, on the other hand, are substantially stabilized radially. The free circumferential flexure of the filter elements is permitted, however, since the filter elements are substantially resilient, they generally assume the configuration shown in FIG. 4, but when subject to sudden surges of pressure will be capable of aiding to flake off solids which might accumulate on the outer surface of the filter elements.

In a preferred embodiment, the following specifications for the filter papers were found to be highly desirable and effective:

| | |
|---|---|
| Weight | 85 pounds per ream of 3000 square feet |
| Tolerance: | 5 pounds+/− |
| Wood fiber furnish: | chemical wood pulp 82% to 85% |
| Resin: | 15% to 18% including approximately 13% to 15.6% of a thermoplastic resin of the class of polyvinyl acetate |

-Continued

2% to 2.4% thermosetting resin
of melamine type [i.e., melamine-
formaldehyde condensation product]

The resin mixture is added to the paper stock and the filter paper formed therefrom. The combination of the resins and wood fiber affords particular advantages in the filtration of lubricating oils and especially for those in diesel locomotives in that it provides an essentially oil-proof, or non-penetrable filter paper which will not soak up oil. This maintains the filter pores at a uniform dimension to provide the degree of filtration that the various stages or filter elements are intended to provide.

On the other hand, many conventional filter papers include a combination of wood fiber and substantial cotton linter. This combination is, however, one which soaks up oil, causing swelling of the filter elements and producing ineffective back pressures and inefficiencies. Accordingly, the filter paper used in elements 14 and 16 should contain no more than 30 percent cotton linter.

In the preferred embodiment the two filter elements 14 and 16 provide an effective filter area of approximately 7,000 square inches. The outer filter element 14 optimumly provides 70 percent of the total filter surface area and, accordingly, the inner filter element provides 30 percent of the total effective filter surface area using the above-described filter paper. The preferred range of percentage of effective filtering in the two-stage filter is from 60 to 80 percent of the effective filter area provided by the outer filter element 14, and from 40 to 20 percent provided by the inner filter element 16 when using the preferred filter paper, though the range may be extended considerably from 15-85% in the outer element 14 and 85-15% in the inner element 16 if different types of paper are used.

The ratio range of 60-80% in the outer element 14 to 40-20% in the inner element 16 provides improved effectiveness in the operation of the filter with the 70%:30% ratio giving peak or optimum efficiency. On the other hand, the ratio of 59%:41% [outer 14 to inner 16] using filter paper described herein provides a filter roughly having only the same effectiveness as a single filter element [i.e. only one filter level] involving only a single stage of filtration.

It will be obvious to those skilled in the art that various changes may be made without departing from the scope of the invention and the invention is not to be considered limited to what is shown in the drawings and described in the specification.

What is claimed is:

1. A filter assembly comprising a first elongated, annular, permeable filter element comprising an annular array of integral pleats presenting series of circumferentially spaced inner and outer peaks, a second elongated, annular permeable filter element comprising an annular array of radial pleats disposed axially within said first filter element and including a series of circumferentially spaced inner and outer peaks, said first filter element comprising about 60 to 80 percent of the total effective filter area of the two filter elements, said filter elements comprising a paper product material including a chemical wood pulp furnish and a resin resistant to oil absorption, said filter elements being free to have relative movement with respect to each other to deter accumulation of filtered material, and a helical, stabilizing coil spring interposed between the apices of the inner and outer peaks of the first and second filter elements, respectively.

2. A filter assembly comprising a first elongated, annular, permeable filter element comprising an annular array of integral pleats presenting series of circumferentially spaced inner and outer peaks, a second elongated, annular permeable filter element comprising an annular array of radial pleats disposed axially within said first filter element and including a series of circumferentially spaced inner and outer peaks, said first filter element comprising about 60 to 80 percent of the total effective filter area of the two filter elements, said filter elements comprising a paper product material including a chemical wood pulp furnish and a resin resistant to oil absorption, said filter elements being free to have relative movement with respect to each other to deter accumulation of filtered material, an outer cylindrical sleeve circumposed about the outer peaks of the first filter element, and said cylindrical sleeve including a plurality of axially spaced circumferential rows of perforations separated by solid bands for approximately the entire length of the outer sleeve for equalizing the force of liquid being introduced into the filter assembly.

3. The structure as claimed in claim 2, in which an inner perforated sleeve is disposed axially within said first filter element and includes a terminal sealing cap at one end, the other end of said inner sleeve being open and disposed adjacent the corresponding end of the outer sleeve, a centrally apertured cap element on the end of the outer sleeve adjacent the open end of said inner sleeve and including an axially converging flange extending into and sealingly engaging the edge of the open end of said inner sleeve.

4. A filter assembly comprising a first elongated, annular, permeable filter element comprising an annular array of integral pleats presenting series of circumferentially spaced inner and outer peaks, a second elongated, annular permeable filter element comprising an annular array of radial pleats disposed axially within said first filter element and including a series of circumferentially spaced inner and outer peaks, an outer cylindrical sleeve circumposed about the outer peaks of the first filter element, said cylindrical sleeve including a plurality of axially spaced circumferential rows of perforations separated by solid bands for approximately the entire length of the outer sleeve for equalizing the force of liquid being introduced into the filter assembly, said first filter element comprising about 60 to 80 percent of the total effective filter area of the two filter elements, said filter elements comprising a paper product material including a chemical wood pulp furnish and a resin resistant to oil absorption, said filter elements being free to have relative movement with respect to each other to deter accumulation of filtered material, an inner perforated sleeve disposed axially within said first filter element and including a terminal sealing cap at one end, the other end of said inner sleeve being open and disposed adjacent the corresponding end of the outer sleeve, a centrally apertured cap element on the end of the outer sleeve adjacent the open end of said inner sleeve and including an axially converging flange extending into and sealingly engaging the edge of the open end of said inner sleeve, said cap element including a resilient seal secured to the cap element and circumposed about said aperture, said seal having a displaceable lip overlying said axially converging flange, a sealing cap element on the other end of said sleeve, said filter element being of a length greater than the outer and inner sleeves; and an axially-extendable, force-transmitting assembly on said sealing cap for forcing said caps into sealing relation with the ends of the filter elements and the sealing lip into engagement with the axially converging flange.

5. A filter assembly comprising a first elongated, annular, permeable filter element comprising an annular array of integral pleats presenting series of circumferentially spaced inner and outer peaks, a second elongated, annular permeable filter element comprising an annular array of radial pleats disposed axially within said first filter element and including a series of circumferentially spaced inner and outer peaks, a stabilizing means interposed between the inner and outer peaks of the first and second filter elements, respectively, and unconnected thereto, said first filter element comprising about 60 to 80 percent of the total effective filter area of the two filter elements, said filter elements comprising a paper product material including a chemical wood pulp furnish and a resin resistant to oil absorption, and said filter elements being free to have relative movement with respect to each other with successive pleats of each filter element being free to flex circumferentially relative to each other to deter accumulation of filtered material.

* * * * *